April 29, 1969 — D. W. HALFHILL ET AL — 3,441,728
SQUARE LAW FUNCTION GENERATOR
Filed Aug. 29, 1966
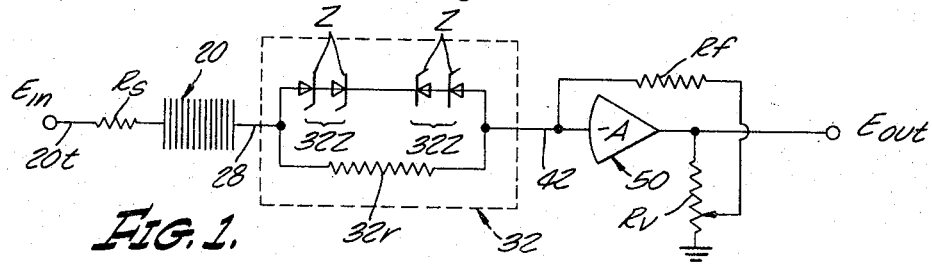
FIG. 1.
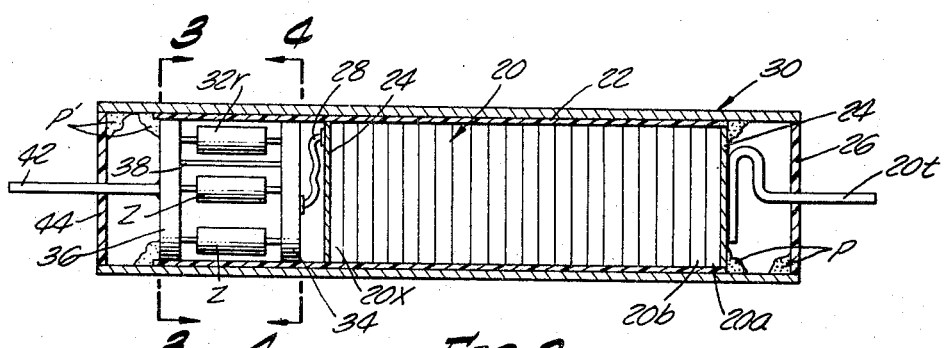
FIG. 2.
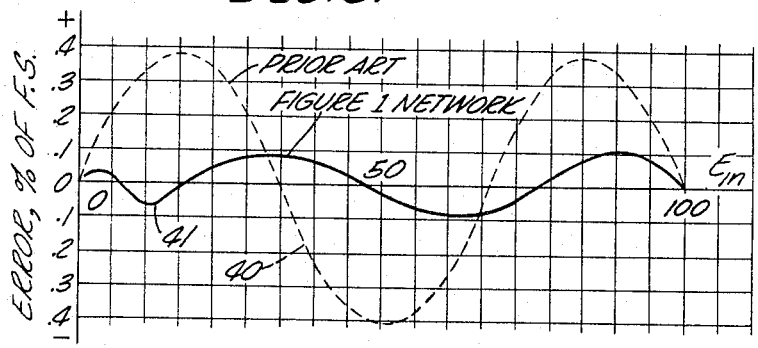
FIG. 5.
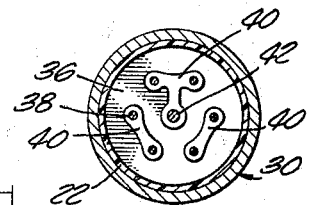
FIG. 3.
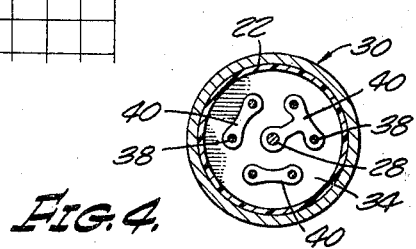
FIG. 4.
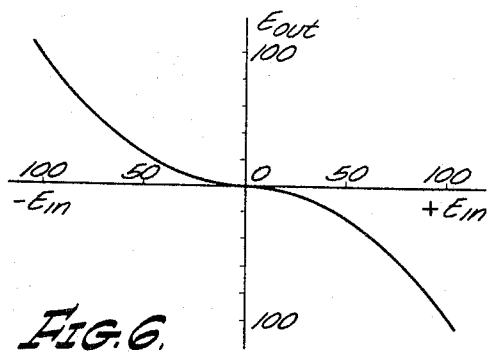
FIG. 6.
DONALD W. HALFHILL
WILLIAM CONLEY, JR.
INVENTORS.
BY 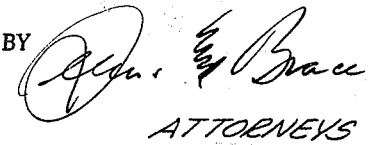
ATTORNEYS

United States Patent Office 3,441,728
Patented Apr. 29, 1969

3,441,728
SQUARE LAW FUNCTION GENERATOR
Donald W. Halfhill, Riverside, and William Comley, Jr., Los Angeles, Calif., assignors by direct and mesne assignments, of one-half each to Bourns, Inc., Riverside, Calif., a corporation of California, and McDonnell Douglas Corporation, Santa Monica, Calif., a corporation of Maryland
Filed Aug. 29, 1966, Ser. No. 575,575
Int. Cl. G06g 7/26
U.S. Cl. 235—197        3 Claims

ABSTRACT OF THE DISCLOSURE

A precision square law function generator comprising a series of serially-connected resistive elements connected in series with a parallel network comprising selective sets of Zener diodes in shunt or parallel relation with a resistor, and utilized with an operational amplifier acting as an input or feedback element. Error swing is minimized for selecting Zener diodes having a soft-knee characteristic.

---

The invention herein disclosed pertains to nonlinear or functional electrical resistance network devices, and more particularly to improvements in devices of the type disclosed in United States Patent No. 3,211,901 issued Oct. 12, 1965, to W. Comley, Jr. et al.

As disclosed in the noted patent, silicon carbide resistive devices are employed in electrical resistance networks to provide an electric output approximately proportional to a power of the input voltage to the network using a set of silicon carbide resistors electrically in series circuit with a resistor. By careful and systematic selection of individual polycrystalline silicon carbide resistors to be included in the set thereof, and by using a selected series resistor and with the combination operating as the input feedback element of an operational amplifier, it is possible to provide a device having a predictable degree of accuracy as respects the input-output equation $E_{out}=K(E_{in})^n$, (wherein K is a constant and $n$ is a number substantially equal to 2) and with a minimum error of approximately 0.4% of full scale. A circuit arrangement exemplified in FIGURE 12 of the noted patent was used.

In attempting to improve the accuracy of the patented invention it was recognized that the principal obstacle lay in the inability of the combination of the varistor units and the series resistor (Rs) to act as a true square law device over an input voltage range in excess of 100 to 1.

By means of the present invention this serious disadvantage and limitation is overcome by employing a multi-stage technique in such manner that the noted combination of a series of varistors and a series resistance need provide the square law approximation over only a more limited range of the order of 10 to 1, the remaining range or extent of range being approximated by the means of the present invention.

According to the invention, the set of polycrystalline silicon carbide resistors, hereinafter termed varistors in the interest of brevity, are serially connected with a parallel network comprising sets of Zener diodes in shunt or parallel relation with a conventional resistor, the entire device then being utilized as an input or feedback element with an operational amplifier. The Zener diodes are connected face-to-back, i.e., anode to cathode or cathode to anode in each set in the shunt circuit. The selected Zener diodes, because of the soft-knee characteristic, that is, because of gradual breakdown at the Zener voltage rather than a sudden breakdown or "sharp" knee characteristic, cause a gradual shift of effective resistance in the parallel circuit from that of the shunt resistor to that of the diodes, which results in the current flow in the network being such that the error swing of the entire circuit is greatly reduced.

Thus it is a principal object of the invention to provide means for so modifying the current input to the previously patented device in such a way as to reduce the over-all error of the circuit.

Another object of the invention is to provide means useful to extend the operating range of the patented device without increasing the error thereof as measured as deviation of the signal from the expected or theoretical value, in terms of percentage of full scale value.

Other objects and advantages of the invention will hereinafter be set out or made evident in the appended claims and following description of a preferred exemplary embodiment of the invention. In the drawings:

FIGURE 1 is a schematic circuit diagram illustrating diagrammatically the electrical components and connections thereof comprised in the preferred exemplary embodiment of the invention;

FIGURE 2 is a partial longitudinal sectional view of a preferred form of squaring device according to the invention, with principal components not sectioned;

FIGURE 3 is a transverse sectional view of the device taken as indicated by arrows 3—3 in FIGURE 2;

FIGURE 4 is a transverse sectional view of the device taken as indicated by arrows 4—4 in FIGURE 2;

FIGURE 5 is a chart or diagram which graphically portrays the error characteristic of the improved device relative to that of the prior art device; and FIGURE 6 is a graph illustrating the change of output potential of the circuit according to the invention, plotted as ordinates and relative to change of input potential plotted as abscissae.

Referring first to FIGURE 1, there is depicted in diagram form a circuit according to the invention with means for markedly reducing the error of the circuit in operation in converting a varying input potential $E_{in}$ to an output potential $E_{out}$ according to the relation $E_{out}=KE_{in}^2$, wherein K is a constant. As is explained in the aforementioned Patent No. 3,211,901, error in following exactly the squaring equation is in part due to the fact that single varistor elements usually a polycrystalline mass of silicon carbide crystals formed as a self-sustaining disc, do not ordinarily conform to the square-law relationship of the stated equation. As is also explained in the patent, correction of the actual operating characteristic of the device of the prior art to bring it into closer conformity with the desired square-law relationship is effected by the use of associated circuit means as depicted in FIGURES 12 and 14, for example, of the patent. There, also, is disclosed the use of means for inverting the negative portion of the input to provide a single-polarity output. Since the background for the present invention is thus extensively explained in Patent No. 3,211,901, the disclosure of that document is by reference incorporated into this specification in the interest of conciseness of the latter.

As diagrammatically depicted in FIGURE 1, and as structurally shown in FIGURE 2, an input terminal 20t is connected to the first of a series 20 of varistor elements 20a, 20b ... 20x arranged in face-to-back relationship in a compressively stressed stack. Each of the varistors comprises opposed conductive faces, whereby the elements are electrically connected in series relation. The varistors are chosen and placed in a stack in a selective manner, one after another, according to an exhibited resistance characteristic; whereby the united series exhibits a desired total resistance and a desired variation when subjected to a varying applied potential. The series of thus selected and stacked varistors is mounted in an insulative sleeve 22 (FIGURE 2), which sleeve may be in the form of a wrapping of adhesive insulative tape, with a conductive metal-disc terminal plate 24, 24 at each end of the stack. At one end of the stack the wire terminal 20t is conductively attached to a plate 24 and is made to extend through an insulative end cap 26 in the form of a disc of insulation. The opposite terminal disc 24 has attached thereto a wire 28. The thus terminated varistor stack is entered into a protective tubular housing 30 which preferably is of metal, and the varistor stack structure is potted in place in the housing as by means of potting compound indicated at P, at the end adjacent terminal 20.

In accordance with the invention, there is connected in series with the varistor stack a parallel network 32 comprising a high-impedance resistor 32r connected in parallel with a plurality of sets 32z, 32z of Zener diodes each set of which comprises two Zener diodes Z connected in face-to-back, either cathode-to-anode or anode-to-cathode, relationship. The network is indicated as enclosed in a dash-line enclosure 32 in FIGURE 1. In the physical structure, illustrated in FIGURE 2, the Zener diodes and resistor 32r are disposed between etched-circuit discs 34 and 36 with their pig-tail terminals conductively affixed to conductive etched-circuit members formed on the discs 34 and 36 as indicated in FIGURES 3 and 4. The discs are of insulative material with conductive pads and paths between apertures receiving respective pig-tail terminals, and have certain sets of the apertures electrically interconnected as shown by conductive material such as 40, whereby with the additional aid of a jumper conductor 38 (FIGURE 2) the resistor 32r and Zener diodes are connected as indicated in FIGURE 1. A second terminal, 42, is conductively affixed in the central aperture of etched-circuit disc 36 (FIGURES 2 and 3) and extends through an insulative cap disc 44 (FIGURE 2). The discs 34 and 36, with the attached diodes, resistor and conductors, are secured in place in housing 30 by potting compound (not shown but indicated in part at P').

Thus, in the manner described there is provided an integral unit comprising a series of series-connected silicon-carbide resistive elements, and a parallel error-reducing network comprising a resistor shunted by a plurality of pairs of Zener diodes connected in face-to-back relationship. That integral unit, depicted in partial-section form in FIGURE 2, is adapted to replace the simple stacked series of silicon-carbide resistors in the functional circuitry disclosed in the aforementioned patent, and to provide the noted reduction of the departure of the output signal from the actual second power of the input signal.

As previously noted, in the prior art device or square-law circuit, an operational amplifier circuit was used in conjunction with the silicon-carbide resistors and a series linear resistor Rs. As indicated in FIGURE 1, the operational amplifier 50 is an inverting amplifier. The output of the amplifier appears at the output signal terminal $E_{out}$. A selected fractional value of the output signal is obtained by way of a variable tap on a resistor Rv connected between the output signal line and ground as shown. The signal derived at the tap is applied via a feedback resistor Rf to the input to the amplifier (line 42).

In FIGURE 5 there is plotted a graph of error showing by the dotted line 40 the departure from theoretical square-law output of an optimum prior art circuit and a corresponding solid line graph of error 41 of the circuit of the invention as depicted in FIGURE 1, the graphs showing percentage deviation or error relative to full scale (100%) as ordinates and input signal as abscissae over a full range of input signal value (zero to maximum positive). The corresponding theoretical output signal is graphically portrayed in FIGURE 6, wherein the input signal varies from about −100 to +100 volts. Departure of the actual output signal from the theoretical square-law values in the circuit according to the invention is such that the graph of the actual output signal is substantially coincident with the graph of the theoretical (zero percent departure) signal. As is indicated in FIGURE 5, the maximum departure or error when employing the FIGURE 1 circuit is about one-tenth of one percent of full-scale value of output signal potential. This contrasts with a departure of substantially four-tenths of one percent of full scale using the prior art circuitry.

An explanation of the operation of the square-law circuit is presented in the noted patent. The considerable deviations of output signal values from theoretical square-law values in the case of the prior art circuit may be explained by examining the actions of the circuit components, and similarly in the case of the much lower departures characteristic of the circuitry according to this invention. In the prior art circuit, as input potential increases from zero to a maximum value in either the positive-going or the negative-going sense or direction, the action of the silicon carbide units alone being such that the output has a value governed by the equation $E_{out}=KE_{in}^n$ wherein K is a proportionality constant and $n$ is in excess of 2, e.g., 2.3; that is, the value is in excess of that desired. With a linear resistor of proper value in series with the varistors, the circuit acts in accord with the same equation but with the value of $n$ decreased to substantially 2. However, due to the attempt to operate that device over an excessive voltage range, the output will not follow exactly the equation $E_{out}=KE_{in}^2$.

It is important to note that the Zener diodes, Z, used in parallel with resistor 32r, are necessarily diodes having a soft-knee voltage-current characteristic; that is, they are characterized by a somewhat gradual breakdown rather than a sharply-defined Zener-conduction characteristic. Thus as the input potential increases in either direction from zero value, and referring to FIGURE 1, the impedance presented by the series of varistors 20 is high, that of the Zener diodes is very much higher, and hence the current is of very low value. As the input signal increases, the varistors decrease markedly in effective impedance, and the impedance of resistor 32r becomes the principal impedance in the current path. Upon still further increase in input signal potential the voltage across the Zener diodes reaches a value at which the diodes commence to conduct, and incident to further rise of the input signal potential the diodes increasingly conduct, rendering the relatively high resistance of resistor 32r of less and less effect as an impedance in the current path. Further increase of input signal potential finally causes voltage saturation in the Zener diodes, rendering varistors and the external resistance Rs the only significant impedance in the circuit. As an over-all result, the current flow is such that departures of output signal from theoretical values are generally more numerous, that is, shift from positive departure to negative and back with greater frequency, but are of greatly decreased magnitude.

As will be evident to those skilled in the art, the advantages gained by incorporation of the means of circuit 32 are not dependent upon the structural arrangement illustrated in FIGURE 2; and other physical arrangements are contemplated in the practice of the invention. Accordingly, it is not desired that the definition of the invention be restricted except as is required by the appended claims.

We claim:
1. A resistive circuit device having an input line and an output line and adapted in response to application to the input line of a variable-potential signal to provide on the output line a potential signal proportional to the second power of the instantaneous value of the input signal, said circuit device comprising in electrical series arrangement between said input and output lines:
  first means, including a series of serially-connected silicon carbide resistive elements; and
  second means serially connected to said first means, including a set of Zener diodes, said diodes of said set being paired with the diodes of any one of the pairs connected in face-to-back relationship and each characterized by gradual or soft-knee Zener breakdown incident to increasing applied potential, said second means further including a linear resistor connected in shunt relation to said diodes;

whereby the output signal of said circuit device exhibited on said output line very accurately represents the second power of the value of a variable potential signal applied to said input line.

2. A resistive circuit device according to claim 1, in which said set of Zener diodes includes a plurality of pairs of Zener diodes arranged electrically in series and with the diodes of said pairs being arranged in face-to-back relationship.

3. A resistive circuit device according to claim 1, which device comprises a tubular housing and in which device said series of silicon carbide resistive elements are of disc-like form and are arranged in a stack and are enclosed in said tubular housing, and in which device said second means are arranged adjacent to one end of said stack in said housing, said device further comprising means to retain said resistive elements and said second means in fixed relative relationship in said housing.

References Cited

UNITED STATES PATENTS

| | | | |
|---|---|---|---|
| 3,089,968 | 5/1963 | Dunn | 307—88.5 |
| 3,173,024 | 3/1965 | Peretz | 307—88.5 |
| 3,211,901 | 10/1965 | Comley | 235—197 |
| 3,241,079 | 10/1966 | Snell | 235—197 X |
| 3,264,553 | 8/1966 | Nathan | 235—197 X |
| 3,315,162 | 4/1967 | Liddle | 328—144 X |

MALCOLM A. MORRISON, *Primary Examiner.*

ROBERT W. WEIG, *Assistant Examiner.*

U.S. Cl. X.R.

328—144; 307—318